(12) United States Patent
Stamoulis et al.

(10) Patent No.: US 9,042,385 B2
(45) Date of Patent: May 26, 2015

(54) TRAFFIC SCHEDULING BASED ON RESOURCE CONTENTION

(75) Inventors: Anastasios Stamoulis, San Diego, CA (US); Rajarshi Gupta, Santa Clara, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 583 days.

(21) Appl. No.: 12/360,349

(22) Filed: Jan. 27, 2009

(65) Prior Publication Data

US 2009/0225712 A1 Sep. 10, 2009

Related U.S. Application Data

(60) Provisional application No. 61/034,097, filed on Mar. 5, 2008.

(51) Int. Cl.
*H04W 72/12* (2009.01)
*H04W 74/08* (2009.01)

(52) U.S. Cl.
CPC ...... *H04W 72/1247* (2013.01); *H04W 72/1242* (2013.01); *H04W 74/0833* (2013.01)

(58) Field of Classification Search
CPC ................... H04W 72/1247; H04W 72/1242; H04W 74/0833
USPC .......... 370/229, 328–330, 336, 337, 370/395.4–395.43, 436, 442–444, 447, 448, 370/458, 461, 468, 310, 343, 347, 348, 351, 370/389, 395.21, 395.1, 431, 445; 718/102–105; 455/403, 422.1, 455, 39, 455/500, 507, 509, 512

See application file for complete search history.

(56) References Cited

U.S. PATENT DOCUMENTS

| 6,907,015 | B1 | 6/2005 | Moulsley et al. | |
|---|---|---|---|---|
| 7,460,509 | B2 * | 12/2008 | Klein et al. | 370/338 |
| 7,706,804 | B2 * | 4/2010 | Huh et al. | 455/450 |
| 8,081,592 | B2 | 12/2011 | Sampath et al. | |
| 2001/0048692 | A1 * | 12/2001 | Karner | 370/442 |
| 2002/0196807 | A1 | 12/2002 | Miura et al. | |
| 2003/0214928 | A1 * | 11/2003 | Chuah | 370/336 |
| 2004/0127226 | A1 * | 7/2004 | Dugad et al. | 455/450 |

(Continued)

FOREIGN PATENT DOCUMENTS

| CN | 101001473 A | 7/2007 |
|---|---|---|
| JP | H04286432 A | 10/1992 |

(Continued)

OTHER PUBLICATIONS

International Search Report/Written Opinion—PCT/US09/036246—International Search Authority EPO—Jun. 19, 2009.

(Continued)

*Primary Examiner* — Obaidul Huq
(74) *Attorney, Agent, or Firm* — Nicholas J. Pauley; Peter Michael Kamarchik; Joseph Agusta

(57) ABSTRACT

In a system where multiple resources are available for carrying traffic, a scheduler may give higher scheduling priority to those resources for which a RUM has been sent. For example, if a node has sent a RUM to reserve a specified carrier of a set of allocated carriers, the scheduler may first attempt to schedule traffic on the specified carrier since there may be less interference on this carrier as a result of the RUM.

23 Claims, 7 Drawing Sheets

(56) References Cited

U.S. PATENT DOCUMENTS

| | | |
|---|---|---|
| 2004/0190640 A1 | 9/2004 | Dubuc et al. |
| 2004/0240422 A1 | 12/2004 | Kim |
| 2005/0276243 A1 | 12/2005 | Sugaya et al. |
| 2006/0264172 A1* | 11/2006 | Izumikawa et al. .......... 455/11.1 |
| 2007/0058544 A1 | 3/2007 | Kim et al. |
| 2007/0097867 A1 | 5/2007 | Kneckt et al. |
| 2007/0105574 A1 | 5/2007 | Gupta et al. |
| 2007/0129080 A1 | 6/2007 | Okuda et al. |
| 2008/0002636 A1 | 1/2008 | Gaur et al. |
| 2008/0075036 A1* | 3/2008 | Bertrand et al. ............. 370/328 |
| 2008/0130550 A1* | 6/2008 | Kim et al. .................... 370/315 |
| 2008/0207214 A1* | 8/2008 | Han et al. ..................... 455/450 |
| 2008/0298482 A1* | 12/2008 | Rensburg et al. ............. 375/260 |

FOREIGN PATENT DOCUMENTS

| | | |
|---|---|---|
| JP | 2003506931 A | 2/2003 |
| JP | 2004364260 A | 12/2004 |
| JP | 2005354326 A | 12/2005 |
| JP | 2007028638 A | 2/2007 |
| JP | 2007158568 A | 6/2007 |
| WO | 2007051140 A2 | 5/2007 |

OTHER PUBLICATIONS

Taiwan Search Report—TW098107213—TIPO—Jul. 26, 2012.

* cited by examiner

US 9,042,385 B2

TRAFFIC SCHEDULING BASED ON RESOURCE CONTENTION

CLAIM OF PRIORITY

This application claims the benefit of and priority to commonly owned U.S. Provisional Patent Application No. 61/034,097, filed Mar. 5, 2008, and assigned Attorney Docket No. 071803P1, the disclosure of which is hereby incorporated by reference herein.

BACKGROUND

1. Field

This application relates generally to wireless communication and more specifically, but not exclusively, to scheduling traffic.

2. Introduction

Deployment of a wireless communication system typically involves implementing some form of interference mitigation scheme. In some wireless communication systems, interference may be caused by neighboring wireless nodes. As an example, in a cellular system wireless transmissions of a cell phone or a base station of a first cell may interfere with communication between a cell phone and a base station of a neighboring cell. Similarly, in a Wi-Fi network, wireless transmissions of an access terminal or an access point of a first service set may interfere with communication between an access terminal and a base station of a neighboring service set.

U.S. Patent Application Publication No. 2007/0105574 describes a system where fair-sharing of a wireless channel may be facilitated by joint scheduling of a transmission by transmitting and receiving nodes through the use of a resource utilization message ("RUM"). Here, a transmitting node may request a set of resources based on knowledge of resource availability in its neighborhood and a receiving node may grant the request based on knowledge of resource availability in its neighborhood. For example, the transmitting node may determine channel availability by listening to receiving nodes in its vicinity and the receiving node may determine potential interference by listening to transmitting nodes in its vicinity.

In the event the receiving node is subjected to interference from neighboring transmitting nodes, the receiving node may transmit a RUM in an attempt to cause the neighboring transmitting nodes to limit their interfering transmissions. According to related aspects, a RUM may be prioritized (e.g., weighted) to indicate not only that a receiving node is disadvantaged (e.g., due to the interference it sees while receiving) and desires a collision avoidance mode of transmission, but also the degree to which the receiving node is disadvantaged.

A transmitting node that receives a RUM may utilize the fact that it has received a RUM, as well as the priority thereof, to determine an appropriate response. For example, the transmitting node may elect to abstain from transmitting, may reduce its transmit power during one or more designated timeslots, may transmit on another carrier, may ignore the RUM, or may take some other action. The advertisement of the RUMs and associated priorities may thus provide a collision avoidance scheme that is fair to all nodes in the system.

SUMMARY

A summary of sample aspects of the disclosure follows. It should be understood that any reference to the term aspects herein may refer to one or more aspects of the disclosure.

The disclosure relates in some aspects to scheduling traffic based on RUMs that have been sent for one more resources. For example, in a multi-resource system where multiple resources (e.g., carriers) are available for carrying traffic, a scheduler identifies the resources (e.g., a subset of the available resources) for which one or more nodes have sent one or more RUMs. The scheduler may then give higher scheduling priority to those resources for which a RUM has been sent. In other words, if a node has sent a RUM to reserve a specified resource, the scheduler may first attempt to schedule traffic on the specified resource (as opposed to a resource for which a RUM was not sent) since there may be less interference on the specified resource due to the RUM.

Priority scheduling for resources on which RUMs have been sent may be performed in different ways for different types of traffic. For example, RUMs from different sources may be taken into account when scheduling reverse link traffic versus forward link traffic.

For the reverse link of a multi-carrier system, an access point may send out a multi-carrier RUM (e.g., that includes a carrier mask indicative of the carriers to which the RUM applies). If this RUM wins the contention for one or more designated carrier (e.g., the access point is free to receive in the next timeslot), the access point may allocate the subcarriers of the designated carrier(s) to the hops on which the access point desires to receive. In this case, any carriers indicated in the carrier mask (i.e., the RUM'ed carriers) are likely to have less interference since interfering transmitters that would normally operate on these carriers may have backed off in response to the RUM. In contrast, the non-RUM'ed carriers (i.e., the carriers for which no RUMs were sent) may have more interference since the interfering transmitters are free to transmit on these carriers. Thus, the access point may give the RUM'ed carriers priority when it is scheduling the reverse link traffic.

For the forward link of a multi-carrier system, access terminals associated with (e.g., served by) an access point may send RUMs specifying different carriers. The access point (e.g., which does the scheduling and has heard all these RUMs) may be aware that carriers associated with successful RUMs (e.g., the RUMs with the highest priority amongst competing RUMs from access terminals that are relatively close to one another) may be likely to have less interference, since interfering transmitters on these carriers may have backed off. In contrast, there may be more interference on any non-RUM'ed carriers. Thus, the access point may give the RUM'ed carriers priority when it is scheduling the forward link traffic.

For the forward link, the access point may take into account several RUMs sent by its associated access terminals. For example, the access point may take a union of the carrier indications sent by its associated access terminals to identify the carriers to be given priority during scheduling. In cases where scheduling is performed on a subcarrier basis, the access point may give priority to subcarriers belonging to the carriers associated with the higher priority RUMs.

In addition, the access point may take into account any RUMs sent by neighboring receiving nodes (e.g., non-associated access terminals for the forward link or neighboring access points for the reverse link). The RUMs from the different RUM-sending nodes may have different priorities (e.g., weights) which may be used to determine which node wins the contention for a given resource. As an example, for the forward link, if RUMs from an access point's associated access terminals that are directed to certain carriers have lower priority than the RUMs from the neighboring access terminals directed to those same carriers, the RUMs from the associated access terminals will likely be ignored by neighboring access points. Consequently, these neighboring access points may cause interference on these carriers. Thus, when scheduling traffic for its forward link, the access point may only consider the carrier indications (e.g., carrier masks) of those RUMs from associated access terminals that have priority higher than the RUMs from the neighboring access terminals.

BRIEF DESCRIPTION OF THE DRAWINGS

These and other sample aspects of the disclosure will be described in the detailed description and the appended claims that follow, and in the accompanying drawings, wherein:

Figure 1:
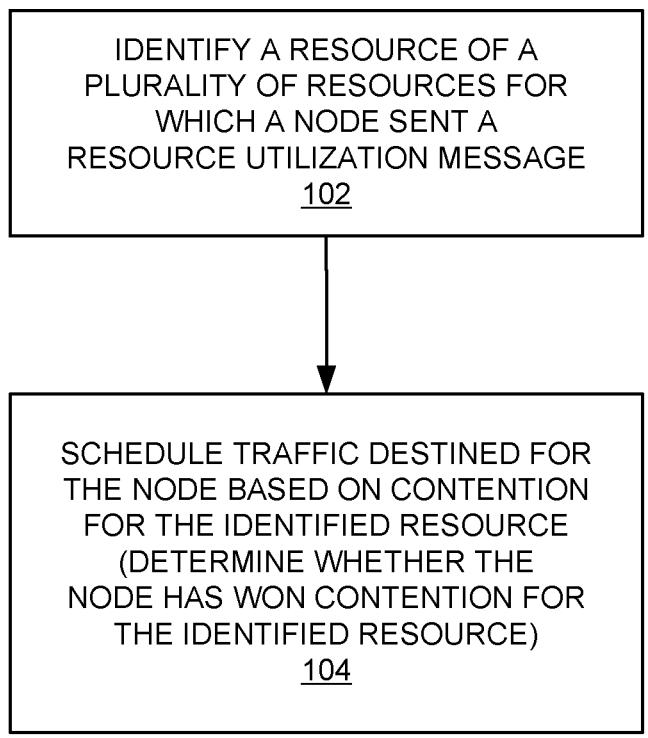
FIG. 1 is a simplified flowchart of several sample aspects of operations that may be performed to schedule traffic.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

As an example of the above, as illustrated in FIG. 1, a method of communication may comprise: identifying a resource of a plurality of resources for which a node sent a resource utilization message (block 102); and scheduling traffic destined for the node based on contention for the identified resource (block 104). In addition, in some aspects the method may further comprise determining whether the node has won the contention for the identified resource based on a priority of the resource utilization message and a priority of at least one other resource utilization message sent by at least one other node.

For illustration purposes, various aspects relating to scheduling traffic will be described in the context of a wireless system where nodes (e.g., access points and access terminals) send RUMs to other nodes in an attempt to reserve one or more system resources. It should be appreciated that the teachings herein also may be applicable to other types of nodes, devices, communication links, and communication systems or to similar entities that are referenced using other terminology. For example, an access terminal may be referred to as user equipment, a mobile unit, and so on.

Figure 2:
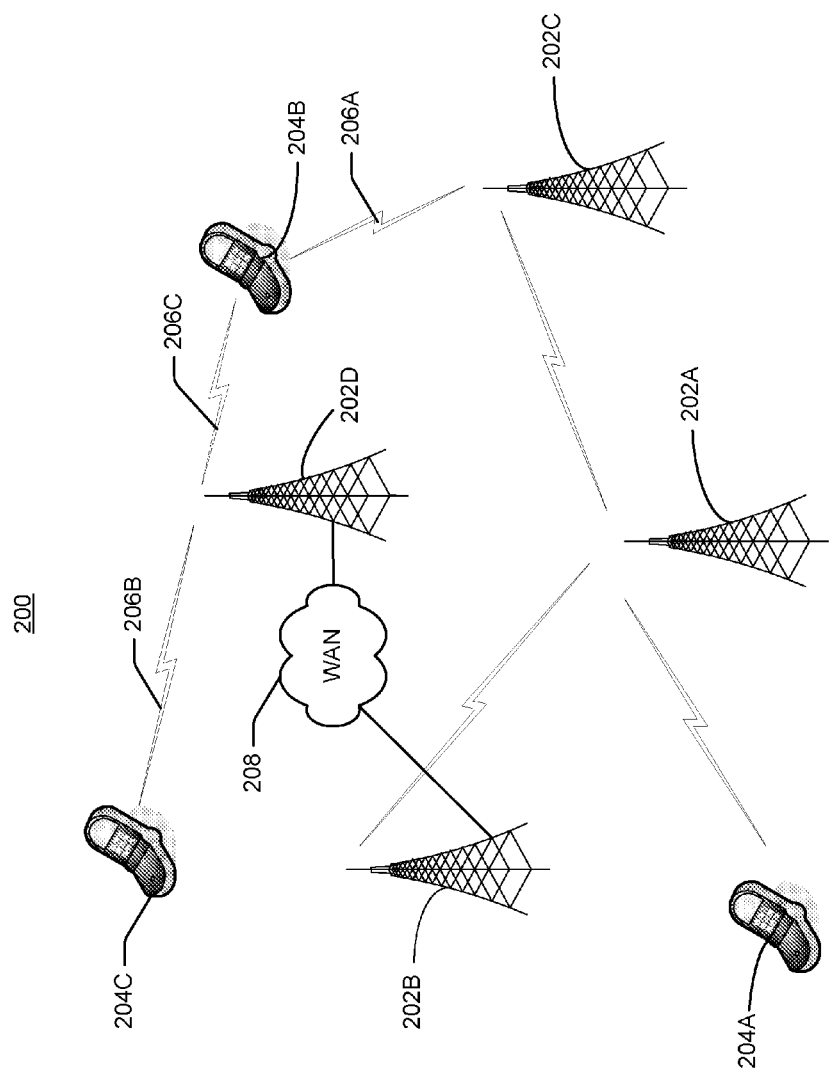
FIG. 2 is a simplified block diagram of a sample communication system.

FIG. 2 illustrates several sample aspects of a wireless communication system 200. The system 200 includes several wireless nodes, generally designated as nodes 202 and 204. A given node may receive and/or transmit one or more traffic flows (e.g., data and/or control channels). For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in various ways. For example, in some implementations a node may comprise an access terminal, a relay point, or an access point. Referring to FIG. 2, the nodes 202 may comprise access points or relay points and the nodes 204 may comprise access terminals. In some implementations the nodes 202 facilitate communication between the nodes of a network (e.g., a cellular network, a WiMAX network, etc.). For example, when an access terminal (e.g., an access terminal 204A) is within a coverage area of an access point (e.g., an access point 202A) or a relay point, the access terminal 204A may thereby communicate with another device of the system 200 or a device of some other network that is coupled to communicate with the system 200. Here, one or more of the nodes (e.g., nodes 202B and 202D) may comprise a wired access point that provides connectivity to another network or networks (e.g., a wide area network 208 such as the Internet).

In some aspects two or more nodes of the system 200 associate with one another to establish traffic flows between the nodes via one or more communication links. For example, the nodes 204A and 204B may associate with one another via corresponding access points 202A and 202C. Thus, one or more traffic flows may be established to and from access terminal 204A via access point 202A and one or more traffic flows may be established to and from access terminal 204B via access point 202C.

In some cases several nodes in the system 200 may attempt to transmit at the same time (e.g., during the same timeslot). Depending on the relative locations of the transmitting and receiving nodes and the transmit power of the transmitting nodes, it may be possible to reliably conduct such concurrent communications. Under these circumstances, the wireless resources of the system 200 may be well utilized as compared to, for example, a system that simply uses a carrier sense multiple access ("CSMA") mode of operation.

Under other circumstances, however, wireless transmissions from a node in the system 200 may interfere with reception at a non-associated node in the system 200. For example, the node 204B may be receiving from the node 202C (as represented by a wireless communication symbol 206A) at the same time that a node 202D is transmitting to a node 204C (as represented by a symbol 206B). Depending on the distance between the nodes 204B and 202D and the transmission power of the node 202D, transmissions from the node 202D (as represented by a dashed symbol 206C) may interfere with reception at the node 204B. In a similar manner, transmissions from the node 204B may interfere with reception at the node 202D depending on the location and transmission power of the node 204B.

To mitigate interference such as this, the nodes of a wireless communication system may employ an inter-node messaging scheme. For example, a receiving node that is experiencing interference may transmit a resource utilization message ("RUM") to indicate that the node is disadvantaged in some way. A neighboring node that receives the RUM (e.g., a potential interferer) may elect to limit its future transmissions in some way to avoid interfering with the RUM-sending node (i.e., the receiving node that sent the RUM). Here, a decision by a receiving node to transmit a RUM may be based, at least in part, on quality of service associated with data received at that node via one or more designated resources. For example, a receiving node may transmit a RUM in the event the current level of quality of service for one or more of its links or flows falls below a desired quality of service level. Conversely, the node may not transmit a RUM if the quality of service is acceptable.

Here, a resource may comprise, for example, one or more carriers, one or more subcarriers (e.g., subsets of a frequency band associated with a carrier), one or more interlaces, one or more timeslots, and so on. For illustration purposes, various aspects of the disclosure may be described in the context of a multi-carrier system. It should be appreciated that the teachings herein may be generally applicable to other types of resources.

With the above in mind, sample operations that may be performed to schedule resources will now be described in the context of the flowcharts of FIGS. 3 and 4. The operations of FIGS. 3 and 4 (or any other operations discussed or taught herein) may be performed by specific components (e.g., components of a system 500 as depicted in FIG. 5). It should be appreciated, however, that these operations may be performed by other types of components and may be performed using a different number of components. It also should be appreciated that one or more of the operations described herein may not be employed in a given implementation.

FIG. 5 illustrates sample components that may be employed in a node 502 that is designated as a scheduling node (e.g., an access point), and a node 504 that is designated as a transmitting/receiving node (e.g., an access terminal). To reduce the complexity of FIG. 5, only two nodes are shown in the system 500. In practice, however, a system such as the system 500 (e.g., corresponding to the system 200) may have many nodes operating as scheduling nodes and many nodes operating as transmitting/receiving nodes at a given time.

The nodes 502 and 504 include respective transceivers 506 and 508 for communicating with each other and other nodes in the system 500. The transceiver 506 includes a transmitter 510 for sending signals (e.g., messages) and a receiver 512 for receiving signals. The transceiver 508 also includes a transmitter 514 for sending signals and a receiver 516 for receiving signals.

For purposes of illustration, several components that may be employed in conjunction with scheduling traffic and sending/receiving traffic and RUMs are shown in the node 502. The node 502 may include a traffic scheduler 518 for scheduling traffic on one or more resources (e.g., timeslots, carriers, subcarriers, and so on). The node 502 may include a priority determiner 520 for determining priority associated with one or more RUMs. The node 502 also may include a resource identifier 522 configured to identify one or more resources. The node 502 may include a RUM generator 524 that generates RUMs. In addition, the node 502 may include a quality of service determiner 526 configured to determine whether quality of service associated with receive traffic is acceptable (e.g., as discussed herein). Furthermore, the node 502 may include a communication controller 528 for processing traffic (e.g., providing traffic to be transmitted and processing receive traffic) and providing other communication related operations.

For purposes of illustration, several components that may be employed in conjunction with sending/receiving traffic and RUMs also are shown in the node 504. The node 504 may include a quality of service determiner 530 configured to determine whether quality of service associated with receive traffic is acceptable. The node 504 may include a resource identifier 532 configured to identify one or more resources on which interference is to be cleared by a RUM. The node 504 may include a priority determiner 534 for determining priority associated with a RUM. The node 504 may include a RUM generator 536 that generates RUMs. The node 504 also may include a communication controller 538 for processing traffic and providing other communication related operations.

Figure 3:
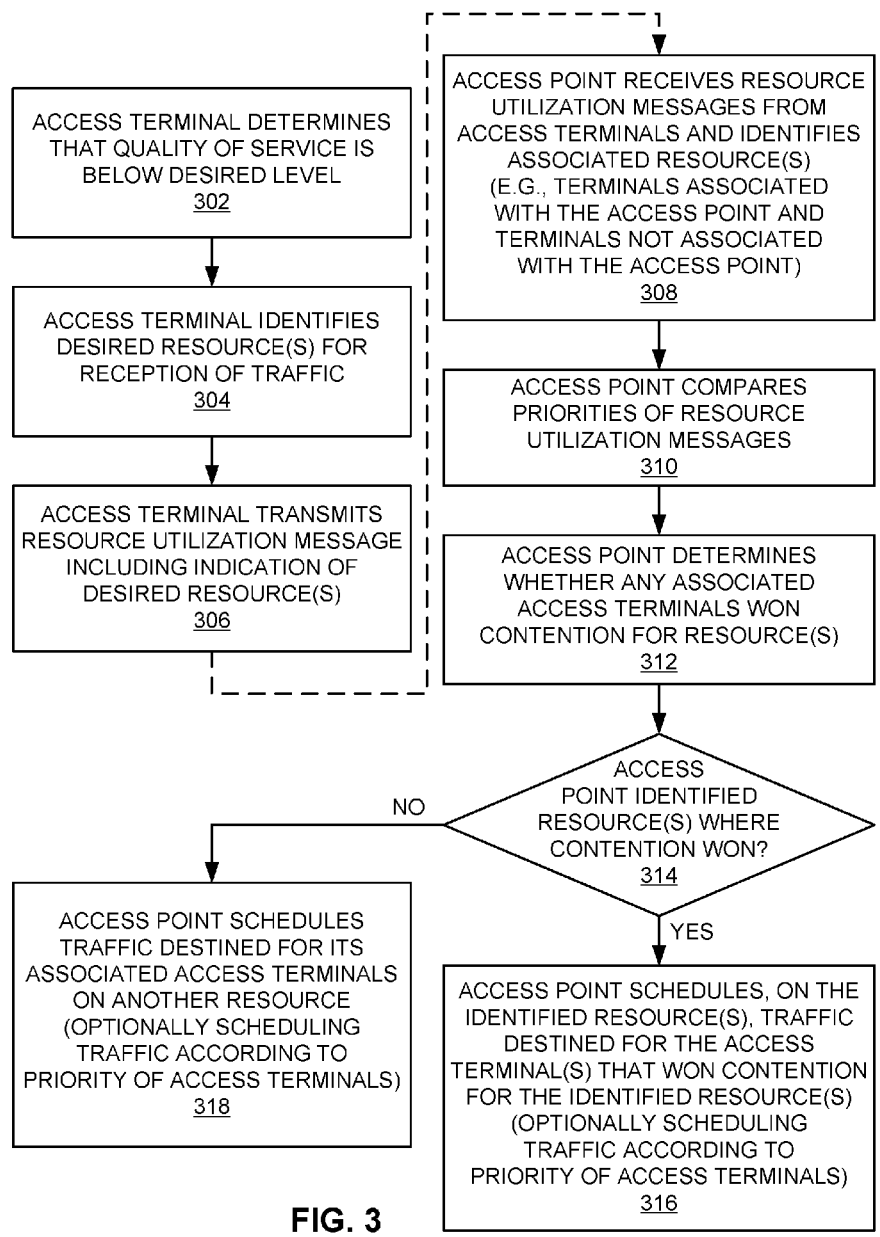
FIG. 3 is a simplified flowchart of several sample aspects of operations that may be performed to schedule traffic destined for one or more access terminals.

Referring now to FIG. 3, several operations are described in the context of an access point (e.g., node 502) that schedules forward link traffic based, at least in part, on RUMs the access point hears from one or more associated access terminals (e.g., node 504). In this example, the access point schedules the traffic the access point will send to the access terminal(s), whereby priority is given to attempting to schedule the traffic over one or more forward link resources for which the access terminal(s) sent one or more RUMs. It should be appreciated that the described operations may be performed by different types of nodes in different implementations. For example, in some implementations an access terminal may schedule traffic.

Blocks 302-306 describe several operations that may be performed by an access terminal (e.g., when operating as a receiving node as discussed herein) in conjunction with generating a RUM. It should be appreciated that operations such as these may be performed by other nodes in the system. For example, at a given point in time, different access terminals may generate RUMs in an attempt to reserve the same or different resources in the system.

As represented by block 302, an access terminal (e.g., the quality of service determiner 530) determines whether it is meeting its quality of service ("QoS") requirements for receive traffic. In some aspects, these quality of service requirements may relate to throughput (e.g., for full buffer traffic), latency (e.g., for voice traffic), average spectral efficiency, minimum carrier-to-interference ratio ("C/I"), or some other suitable metrics or metrics. Thus, the determination of block 302 may involve, for example, comparing a corresponding metric indicative of the current quality of service for the receive traffic with a quality of service threshold indicative of a desired level of quality of service. In this way, the access terminal may determine whether the current quality of service is below a desired level (e.g., less than or equal to the threshold level).

As represented by block 304, in some implementations the access terminal (e.g., the resource identifier 532) may identify one or more desired resources for the reception of traffic. For example, in a multi-carrier system, the available bandwidth is divided into a number of carriers (e.g., 4 carriers). Thus, traffic flow may be scheduled over one or more carriers (e.g., scheduled over several subcarriers of a given carrier), thereby allowing better sharing of the resources. In such a case, the access terminal may elect to send a RUM that that is directed to a subset (e.g., one or more) of the allocated carriers.

In other implementations, the access point that serves the access terminal may select the resource(s) to be used to send traffic to the access terminal. In this case, the access point may send an indication of the selected resource(s) to the access terminal. Such a selection may be static or dynamic.

As represented by block 306, if the access terminal is not meeting its quality of service requirements, the access terminal transmits a RUM in an attempt to clear interference from the identified resource(s). In the example of FIG. 5, the RUM generator 536 may generate the RUM.

A RUM may take various forms. For example, in some cases a RUM may consist of a series of tones. In some cases different tones may cover different frequency bands. In some cases the RUMs from different devices may be ordered in some manner (e.g., in time and/or frequency)

A RUM may including an indication that identifies the resources to which the RUM applies (e.g., as identified at block 304). For example, in a multi-carrier system, a node may transmit a RUM that includes an indication of the carriers to which the RUM is directed.

Such a carrier indication may take various forms. For example, in some cases the carrier indication may take the form of a set of bits where each bit corresponds to a branch of a tree, where each branch corresponds, in turn, to a carrier. For example, one bit may correspond to a first carrier, another bit may correspond to a set of carriers (e.g., which may include one or more carriers or sets of carriers). In other cases, the carrier indication may take the form of a bit mask. For example, each bit of the mask may correspond to a unique one of the carriers.

A RUM also may include (e.g., encapsulate) a priority indication that signifies, for example, the "degree of disadvantage" faced by the node that transmits the RUM. As mentioned above, the degree of disadvantage may be a function of the node's actual quality of service and the node's desired quality of service. In the example of FIG. 5, this priority may be determined by the priority determiner 534.

Priority information associated with a RUM may take various forms. For example, in some cases priority information may take the form of a weighting factor (weight). Such a weighting factor may be normalized. For example, a weighting factor may be normalized so that it is represented by a few bits (e.g., two or three bits) to reduce the overhead associated with the weighting factor. In some cases priority may be indicated by the ordering of RUMs (e.g., in time and/or frequency). For example, RUMs occurring earlier in time and/or on certain frequencies may be associated with a higher priority.

Once the RUM is generated, the access terminal (e.g., the transmitter 514) transmits the RUM in an attempt to clear interference from one or more resources during a specific transmission opportunity. Here, the RUM is transmitted in a manner (e.g., at an appropriate time and via a designated frequency-division multiplexed control channel) so it will be heard by nearby transmitting nodes. These nodes include, for example, an associated access point, as well as transmitting nodes (e.g., non-associated access points) that may potentially interfere with reception at the access terminal.

Blocks 308-318 describe several scheduling-related operations that may be performed by an access point (e.g., when operating as a transmitting node as discussed herein). As mentioned above, the scheduling decision made by the access point may be based, in part, on the RUMs heard by the access point.

As represented by block 308, the access point (e.g., the receiver 512) may receive RUMs from one or more access terminals (e.g., receiving nodes). In particular, the access point may receive RUMs from one or more associated access terminals (e.g., a node to which the access point is transmitting information) and/or from one or more non-associated access terminals (e.g., nearby access terminals that are receiving information from other access points).

As mentioned above, a RUM may include a resource indication that specifies the resources for which that particular RUM applies. Accordingly, the access point (e.g., the resource identifier 522) may identify the resource(s) to which each of the received RUMs is directed. In this way, the access point may identify the resources that the neighboring access terminals are trying to clear of interference.

Also as mentioned above, a RUM may include a priority indication that specifies, for example, the "degree of disadvantage" experienced by given access terminal. Accordingly, as represented by block 310, the access point (e.g., the traffic scheduler 518) may compare the priorities of the RUMs for the identified resources to identify the node/nodes that has/have the highest priority.

As represented by blocks 312 and 314, the access point may thus determine whether any of its access terminals have won the contention for one or more resources. For example, in a case where the access point receives several RUMs that are directed to the same resource, the access point may determine whether any of the RUMs sent by the access terminals associated with the access point have a higher priority than any of the RUMs sent by any non-associated access terminals. If an associated access terminal has the highest priority, the associated access terminal may be deemed to have won the contention for that resource. Consequently, the access point is free to schedule traffic on that resource (e.g., during the transmission opportunity to which the RUM was directed).

Conversely, if a non-associated access terminal has the highest priority, the associated access terminal may be deemed to have lost the contention for the resource. In this case, the access point may elect to obey the RUM from the non-associated access terminal. Consequently, the access point may not be free to schedule traffic on that resource.

As represented by block 316, in the event at least one of the access terminals associated with the access point won the contention for the resource(s), the access point (e.g., the scheduler 518) may schedule forward link traffic for some or all of its associated access terminals on the corresponding resource(s). As mentioned above, a given RUM may be directed to more than one resource (e.g., multiple carriers). In addition, the access point may have received RUMs from several associated access terminals, wherein some of these RUMs may have been directed to different resources. Consequently, the access point may elect to schedule forward link traffic on one or more of these resources at block 316.

In addition, in the event there are other resources available, the access point may elect to schedule forward link traffic on these resources as well. For example, the access point may schedule traffic on any resources for which no RUMs were sent.

As mentioned above, however, the scheduler 518 will first attempt to schedule on the resources for which RUMs were sent since there may be less interference on these resources. These resources may have less interference because any nearby access point that could potentially cause interference on these resources should have heard the RUMs for those resources. Consequently, these access points should have determined that their access terminals did not win the contention. As a result, these access points should limit their transmissions on these resources during the designated transmission opportunity.

There are various methods by which a node may limit its transmissions for an upcoming transmission opportunity (e.g., the next scheduled timeslot). Several examples include: backing-off in time (e.g., refraining from transmitting over some slots or interlaces); backing-off in frequency (e.g., refraining from transmitting over some frequency bands or carriers); and backing-off in power (e.g., reducing transmit power during the next timeslot).

In a multi-carrier system, when a node hears the RUM, it may obey the RUM only on the carriers specified by the carrier indication. When a node elects to obey multiple RUMs from different receivers, it may perform an 'OR' operation on the carriers specified by all of the RUM carrier indications. The complement of the result of this operation may thus indicate the carriers that the node may transmit on.

In some cases the scheduler 518 may schedule traffic destined for different access terminals on different portions of a resource (e.g., subcarriers of a carrier). For example, the scheduler 518 may maintain a list of subcarriers to allocate to different access terminals. Here, subcarriers belonging to the RUM'ed carriers (i.e., the carriers for which a RUM was sent) may be placed at the top of a list. For example, two permutations of subcarriers may be made (e.g., one for carriers for which a RUM was sent and another for carriers for which no RUMs were sent), and then these lists may be concatenated. This may ensure that the RUM'ed carriers are picked first. In some implementations a random permutation of subcarriers may be used.

The scheduler 518 may allocate resources based on relative priorities associated with the traffic flows or the hops to associated nodes. For example, the scheduler 518 may first try to allocate resources to the flows or hops that have the highest priority (e.g., are in the greatest need for data). These priorities may be based, for example, on at least one of: traffic flow rate, amount of buffered traffic, resource utilization message priority, traffic flow type (e.g., voice, data, traffic flow class, etc.), head of line delay, or a quality of service parameter. As above, the scheduler 518 may first try to schedule the traffic flows or hops associated with the highest relative priority on the resources where there is the least amount of interference (e.g., the carriers for which the RUMs from associated nodes won the contention).

Referring again to FIG. 3, as represented by block 318, in the event none of the access terminals associated with access point won the contention for the resource(s), the access point may elect to schedule forward link traffic on some other resource(s). For example, the access point may schedule the traffic on one or more resources for which no RUMs were sent. As above, the scheduler 518 may allocate resources based on relative priorities associated with the traffic flows or the hops in this case. Also, the scheduler 518 may schedule different portions of a resource (e.g., subcarriers of a carrier) for traffic destined for different access terminals.

Figure 4:
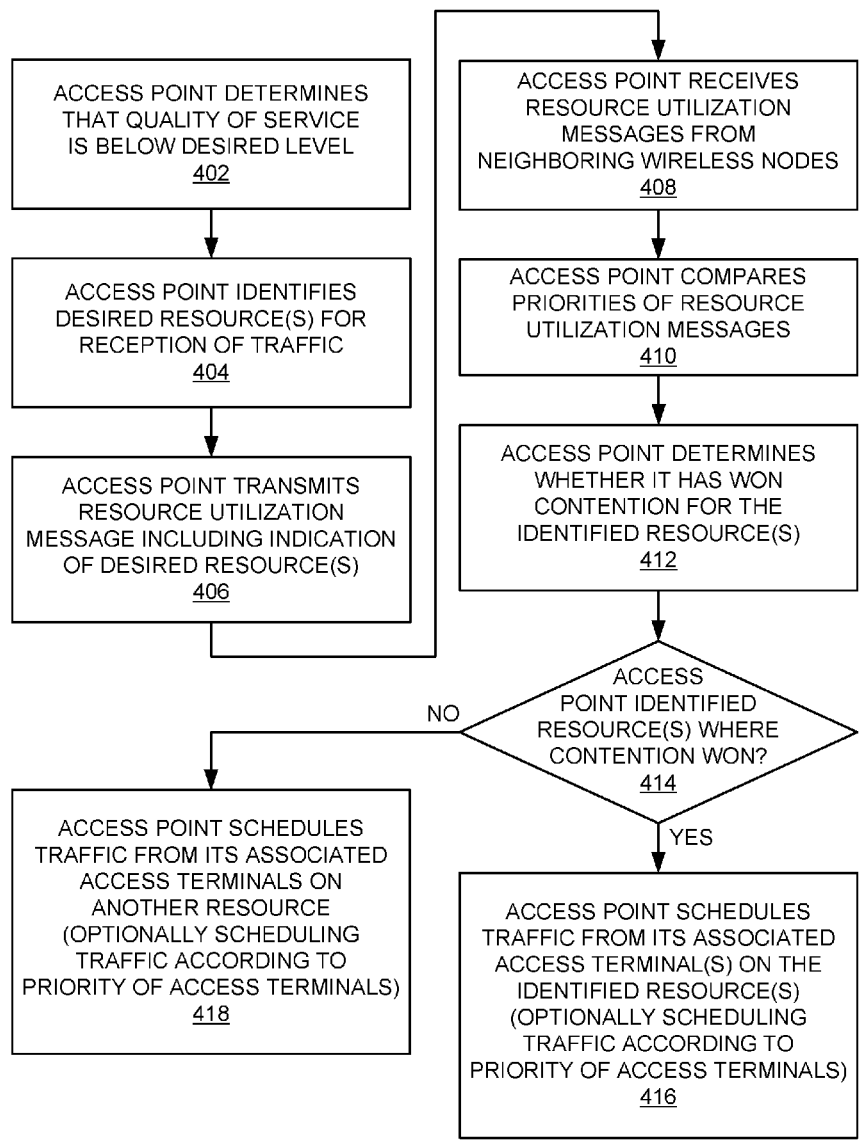
FIG. 4 is a simplified flowchart of several sample aspects of operations that may be performed to schedule traffic from one or more access terminals.
Figure 5:
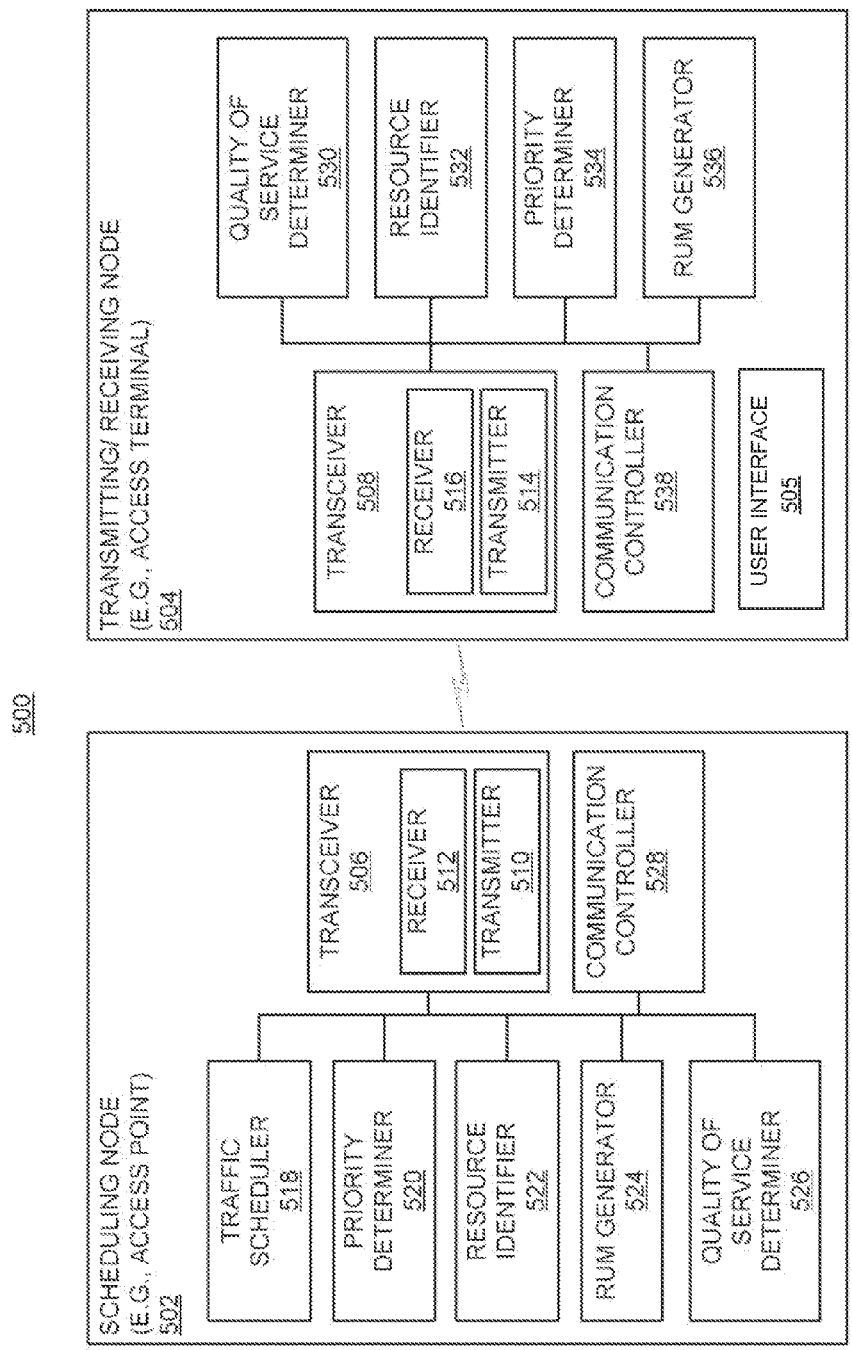
FIG. 5 is a simplified block diagram of several sample components of communication nodes.

Referring now to FIG. 4, several operations are described in the context of an access point (e.g., node 502) that schedules reverse link traffic based, at least in part, on a RUM sent out by the access point. In this example, the access point schedules the traffic that the access point will receive from one or more associated access terminals (e.g., node 504), wherein priority is given to attempting to schedule this traffic over the reverse link resource(s) for which the access point sent the RUM.

Blocks 402-406 describe several operations that may be performed by an access point (e.g., when operating as a receiving node as discussed herein) in conjunction with generating a RUM. Again, it should be appreciated that operations such as these may be performed by other nodes in the system.

As represented by block 402, an access point (e.g., the quality of service determiner 526) determines whether it is meeting its quality of service ("QoS") requirements for receive traffic. For example, the access point may determine whether the current quality of service is below a desired level as described above.

As represented by block 404, the access point (e.g., the resource identifier 522) may identify one or more desired resources for the reception of traffic. Again, in a multi-carrier system, the access point may elect to send a RUM that is directed to a subset (e.g., one or more) of a set of allocated carriers.

As represented by block 406, if the access point is not meeting its quality of service requirements, the access terminal transmits a RUM in an attempt to clear interference from the identified resource(s). Here, the RUM generator 524 may generate the RUM including, for example, an indication of the resources to which the RUM applies (e.g., as identified at block 404) and a priority indication that signifies the "degree of disadvantage" faced by the access point. In the example of FIG. 5, this priority may be determined by the priority determiner 520.

Once the RUM is generated, the access point (e.g., the transmitter 510) transmits the RUM in an attempt to clear interference from one or more resources during a specific transmission opportunity. Again, the RUM is transmitted in a manner (e.g., at the appropriate time) so it will be heard by nearby transmitting nodes. These nodes include, for example, associated access terminals, as well as transmitting nodes (e.g., non-associated access terminals) that may potentially interfere with reception at the access point.

Blocks 408-418 describe several scheduling-related operations that may be performed by the access point. As mentioned above, the scheduling decision made by the access point may be based, in part, on the RUMs heard by the access point.

As represented by block 408, the access point (e.g., the receiver 512) may receive RUMs from one or more neighboring access points (e.g., receiving nodes). That is, other access points in the vicinity may transmit RUMs for the same transmission opportunity as the access point. As discussed above, the access point (e.g., the resource identifier 522) may identify the resource(s) to which each of the received RUMs is directed.

As represented by block 410, the access point (e.g., the scheduler 518) then compares the priorities of the RUMs for the identified resources. In this way, the access point may identify the node/nodes that has/have the highest priority.

As represented by blocks 412 and 414, the access point may thus determine whether it has won the contention for one or more resources. For example, in a case where the access point sent a RUM that is directed to the same resource as a received RUM, the access point may determine whether its RUM has a higher priority than any of the received RUMs.

As represented by block 416, in the event the access point won the contention for the resource(s), the access point (e.g., the scheduler 518) may schedule reverse link traffic from some or all of its associated access terminals on the corresponding resource(s). As mentioned above, the winning RUM may be directed to more than one resource (e.g., multiple carriers) whereby the access point may elect to schedule reverse link traffic on one or more of these resources at block 416. Also, in the event there are other resources available, the access point may elect to schedule reverse link traffic on these resources, but at a lower priority than the RUM'ed resources as discussed above. Also, the scheduler 518 may schedule traffic from different access terminals on different portions of a resource (e.g., subcarriers of a carrier). In addition, the scheduler 518 may allocate resources based on relative priorities associated with the traffic flows or the hops to associated nodes.

As represented by block 418, in the event the access point did not win the contention for the resource(s), the access point may elect to schedule reverse link traffic on some other resource(s). For example, the access point may schedule the traffic on one or more resources for which no RUMs were sent as discussed above. Again, the scheduler 518 may allocate resources based on relative priorities associated with the traffic flows or the hops to associated nodes.

Figure 6:
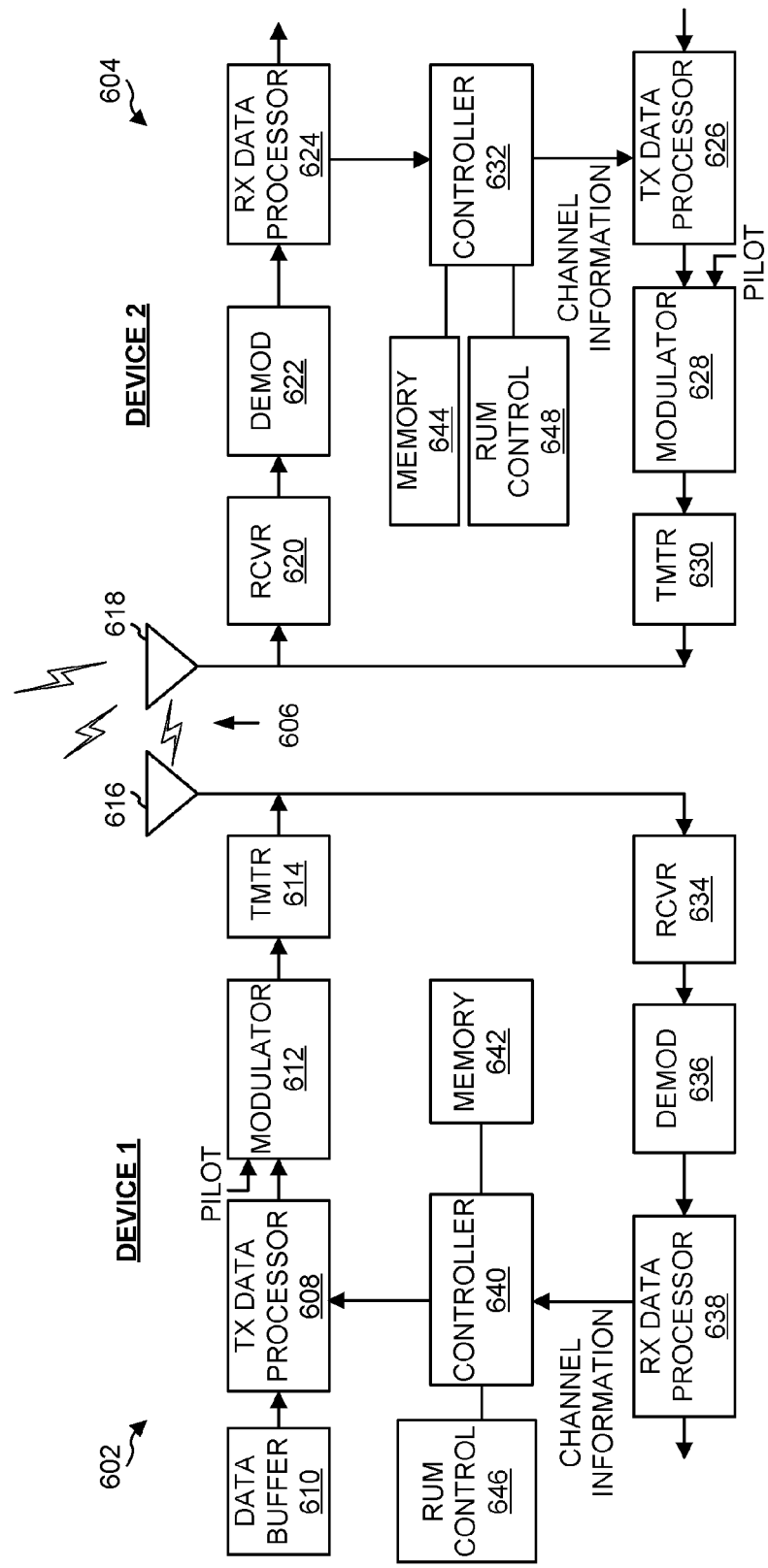
FIG. 6 is a simplified block diagram of several sample aspects of communication components.

The teachings herein may be incorporated into a device employing various components for communicating with at least one other wireless device. FIG. 6 depicts several sample components that may be employed to facilitate communication between devices. Here, a first device 602 (e.g., an access terminal) and a second device 604 (e.g., an access point) are adapted to communicate via a wireless communication link 606 over a suitable medium.

Initially, components involved in sending information from the device 602 to the device 604 (e.g., a reverse link) will be treated. A transmit ("TX") data processor 608 receives traffic data (e.g., data packets) from a data buffer 610 or some other suitable component. The transmit data processor 608 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 612 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 614 processes (e.g., converts to analog, filters, amplifies, and frequency upconverts) the output chip stream and generates a modulated signal, which is then transmitted from an antenna 616.

The modulated signals transmitted by the device 602 (along with signals from other devices in communication with the device 604) are received by an antenna 618 of the device 604. A receiver ("RCVR") 620 processes (e.g., conditions and digitizes) the received signal from the antenna 618 and provides received samples. A demodulator ("DEMOD") 622 processes (e.g., demodulates and detects) the received samples and provides detected data symbols, which may be a noisy estimate of the data symbols transmitted to the device 604 by the other device(s). A receive ("RX") data processor 624 processes (e.g., symbol demaps, deinterleaves, and decodes) the detected data symbols and provides decoded data associated with each transmitting device (e.g., device 602).

Components involved in sending information from the device 604 to the device 602 (e.g., a forward link) will be now be treated. At the device 604, traffic data is processed by a transmit ("TX") data processor 626 to generate data symbols. A modulator 628 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 630 and transmitted from the antenna 618. In some implementations signaling for the forward link may include power control commands and other information (e.g., relating to a communication channel) generated by a controller 632 for all devices (e.g. terminals) transmitting on the reverse link to the device 604.

At the device 602, the modulated signal transmitted by the device 604 is received by the antenna 616, conditioned and digitized by a receiver ("RCVR") 634, and processed by a demodulator ("DEMOD") 636 to obtain detected data symbols. A receive ("RX") data processor 638 processes the detected data symbols and provides decoded data for the device 602 and the forward link signaling. A controller 640 receives power control commands and other information to control data transmission and to control transmit power on the reverse link to the device 604.

The controllers 640 and 632 direct various operations of the device 602 and the device 604, respectively. For example, a controller may determine an appropriate filter, reporting information about the filter, and decode information using a filter. Data memories 642 and 644 may store program codes and data used by the controllers 640 and 632, respectively.

FIG. 6 also illustrates that the communication components may include one or more components that perform traffic scheduling operations as taught herein. For example, a RUM control component 646 may cooperate with the controller 640 and/or other components of the device 602 to send and receive signals to another device (e.g., device 604) as taught herein. Similarly, a RUM control component 648 may cooperate with the controller 632 and/or other components of the device 604 to send and receive signals to another device (e.g., device 602). It should be appreciated that for each device 602 and 604 the functionality of two or more of the described components may be provided by a single component. For example, a single processing component may provide the functionality of the RUM control component 646 and the controller 640 and a single processing component may provide the functionality of the RUM control component 648 and the controller 632.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings hgerein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rc199, Rc15, Rc16, Rc17) technology, as well as 3GPP2 (IxRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may thus include various components that perform functions based on data transmitted by or received at the wireless node. For example, an access point and an access terminal may include an antenna for transmitting and receiving signals (e.g., messages traffic relating to control and/or data). An access point also may include a traffic manager configured to manage data traffic flows that its receiver receives from a plurality of wireless nodes or that its transmitter transmits to a plurality of wireless nodes. In addition, an access terminal may include a user interface configured to output an indication based on received data (e.g., scheduled traffic).

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 7:
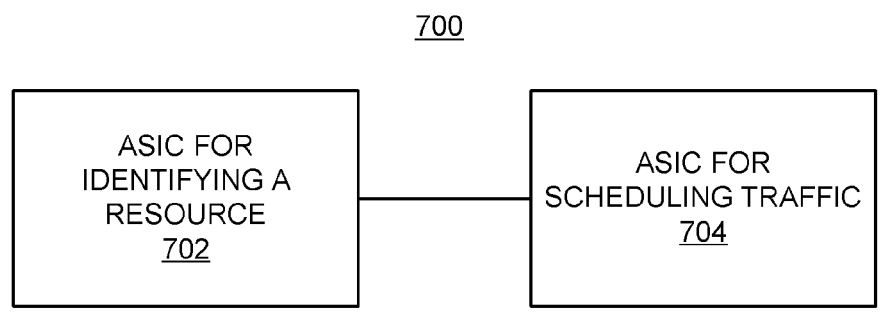
FIG. 7 is a simplified block diagram of several sample aspects of an apparatus configured to provide functionality relating to scheduling traffic as taught herein.

The components described herein may be implemented in a variety of ways. Referring to FIG. 7, an apparatus 700 is represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatus 700 may include one or more modules that may perform one or more of the functions described above with regard to various figures. For example, an ASIC for identifying a resource 702 may correspond to, for example, a resource identifier as discussed herein. An ASIC for scheduling traffic 704 may correspond to, for example, a traffic scheduler as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of any components represented by dashed boxes are optional.

As noted above, the apparatus 700 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIG. 7 as well as other components and functions described herein, may be implemented using any suitable means. Such means also may be implemented, at least in part, using corresponding structure as taught herein. For example, the components described above in conjunction with the "ASIC for" components of FIG. 7 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof"

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., encoded with codes executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   receiving, by an access point, resource utilization messages sent by a first access terminal associated with the access point and sent by second access terminals not associated with the access point, each of the resource utilization messages having a priority and specifying one or more resources that are desired by a respective access terminal for reception of traffic;
   identifying one or more resources that are specified by the first access terminal;
   comparing priorities of the received resource utilization messages;
   making a determination, by the access point, whether the first access terminal has won contention for one or more of the identified one or more resources based on the priorities; and
   scheduling, by the access point, traffic destined for the first access terminal based on a result of the determination, wherein the traffic is scheduled on one or more resources that were not identified by the first access terminal if the first access terminal has not won the contention for the one or more of the identified one or more resources.

2. The method of claim 1, wherein the traffic destined for the first access terminal is scheduled on the one or more of the identified one or more resources if the access point determines that the first access terminal has won the contention for the one or more of the identified one or more resources.

3. The method of claim 1, wherein the identified one or more resources comprise a subset of a plurality of available carriers.

4. The method of claim 3, wherein:
   each of the carriers comprises a plurality of subcarriers; and the scheduling the traffic destined for the first access terminal comprises scheduling the traffic on at least a portion of the subcarriers.

5. The method of claim 1, wherein the scheduling the traffic is further based on priority of the traffic.

6. The method of claim 1, wherein:
the first access terminal is one of a set of access terminals associated with the access point; and
the scheduling the traffic comprises scheduling the first access terminal to use the one or more of the identified one or more resources according to relative priorities of traffic flows associated with the set of access terminals associated with the access point.

7. The method of claim 6, wherein the relative priorities are based on at least one of: traffic flow rate, amount of buffered traffic, resource utilization message priority, traffic flow type, head of line delay, or a quality of service parameter.

8. An apparatus for wireless communication, comprising:
means for receiving, by an access point, resource utilization messages sent by a first access terminal associated with the access point and sent by second access terminals not associated with the access point, each of the resource utilization messages having a priority and specifying one or more resources that are desired by a respective access terminal for reception of traffic;
means for identifying one or more resources that are specified by the first access terminal;
means for comparing priorities of the received resource utilization messages;
means for making a determination, by the access point, whether the first access terminal has won contention for one or more of the identified one or more resources based on the priorities; and
means for scheduling, by the access point, traffic destined for the first access terminal based on a result of the determination, wherein the means for scheduling the traffic schedules the traffic on one or more resources that were not identified by the first access terminal if the first access terminal has not won the contention for the one or more of the identified one or more resources.

9. The apparatus of claim 8, wherein the means for scheduling the traffic schedules the traffic destined for the first access terminal on the one or more of the identified one or more resources if the access point determines that the first access terminal has won the contention for the one or more of the identified one or more resources.

10. The apparatus of claim 8, wherein the identified one or more resources comprise a subset of a plurality of available carriers.

11. The apparatus of claim 10, wherein:
each of the carriers comprises a plurality of subcarriers; and
the means for scheduling the traffic destined for the first access terminal comprises means for scheduling the traffic on at least a portion of the subcarriers.

12. The apparatus of claim 8, wherein the means for scheduling the traffic schedules the traffic based on priority of the traffic.

13. The apparatus of claim 8, wherein:
the first access terminal is one of a set of access terminals associated with the access point; and
the means for scheduling the traffic schedules the first access terminal to use the one or more of the identified one or more resources according to relative priorities of traffic flows associated with the set of access terminals associated with the access point.

14. The apparatus of claim 13, wherein the relative priorities are based on at least one of: traffic flow rate, amount of buffered traffic, resource utilization message priority, traffic flow type, head of line delay, or a quality of service parameter.

15. An apparatus for communication, comprising:
a receiver, included in an access point, configured to receive resource utilization messages sent by a first access terminal associated with the access point and sent by second access terminals not associated with the access point, each of the resource utilization messages having a priority and specifying one or more resources that are desired by a respective access terminal for reception of traffic;
a resource identifier configured to identify one or more resources that are specified by the first access terminal;
a priority determiner configured to compare priorities of the received resource utilization messages and to make a determination whether the first access terminal has won contention for one or more of the identified one or more resources based on the priorities; and
a traffic scheduler configured to schedule traffic destined for the first access terminal based on a result of the determination by the priority determiner, wherein the traffic scheduler schedules the traffic destined for the first access terminal on one or more resources that were not identified by the first access terminal if the first access terminal has not won the contention for the one or more of the identified one or more resources.

16. The apparatus of claim 15, wherein the traffic scheduler schedules the traffic destined for the first access terminal on the one or more of the identified one or more resources if the priority determiner determines that the first access terminal has won the contention for the one or more of the identified one or more resources.

17. The apparatus of claim 15, wherein the identified one or more resources comprise a subset of a plurality of available carriers.

18. The apparatus of claim 17, wherein:
each of the carriers comprises a plurality of subcarriers; and
the traffic scheduler schedules the traffic destined for the first access terminal on at least a portion of the subcarriers.

19. The apparatus of claim 15, wherein the traffic scheduler is further configured to schedule the traffic based on priority of the traffic.

20. The apparatus of claim 15, wherein:
the first access terminal is one of a set of access terminals associated with the access point; and
the traffic scheduler is further configured to schedule the first access terminal to use the one or more of the identified one or more resources according to relative priorities of traffic flows associated with the set of access terminals associated with the access point.

21. The apparatus of claim 20, wherein the relative priorities are based on at least one of: traffic flow rate, amount of buffered traffic, resource utilization message priority, traffic flow type, head of line delay, or a quality of service parameter.

22. A computer-program product for communication, comprising:
a non-transitory computer-readable medium encoded with codes executable to cause a processor included in an access point to:
receive resource utilization messages sent by a first access terminal associated with the access point and sent by second access terminals not associated with the access point, each of the resource utilization messages having a priority and specifying one or more resources that are desired by a respective access terminal for reception of traffic;

identify one or more resources that are specified by the first access terminal;

compare priorities of the received resource utilization messages;

make a determination whether the first access terminal has won contention for one or more of the identified one or more resources based on the priorities; and schedule traffic destined for the first access terminal based on a result of the determination, wherein the traffic is scheduled on one or more resources that were not identified by the first access terminal if the first access terminal has not won the contention for the one or more of the identified one or more resources.

23. An access terminal, comprising:

a receiver, included in the access terminal, configured to receive resource utilization messages sent by a first node associated with the access terminal and sent by a plurality of second nodes not associated with the access terminal, each of the resource utilization messages having a priority and specifying one or more resources that are desired by a respective node for reception of traffic;

a resource identifier configured to identify one or more resources that are specified by the first node;

a priority determiner configured to compare priorities of the received resource utilization messages and to make a determination whether the first node has won contention for one or more of the identified one or more resources based on the priorities;

a traffic scheduler configured to schedule traffic destined for the first node based on a result of the determination by the priority determiner, wherein the traffic is scheduled on one or more resources that were not identified by the resource identifier if the first node has not won the contention for the one or more of the identified one or more resources; and a user interface configured to output an indication based on the scheduled traffic.

* * * * *